March 14, 1961 O. E. RIDLEY 2,974,928
STATOR RING LOCKING KEY
Filed Oct. 16, 1959

Inventor
OSCAR E. RIDLEY
By R. J. Tompkins
Attorney

2,974,928
STATOR RING LOCKING KEY

Oscar E. Ridley, North Wilmington, Mass., assignor, by mesne assignments, to the United States of America as represented by the Secretary of the Navy Filed Oct. 16, 1959, Ser. No. 847,030

1 Claim. (Cl. 253—78)

The present invention relates to a means for locking a stator ring and more particularly to a means for keying the outer stator ring to a solid turbine housing so that the ring will not rotate relative to the housing and so that assembly and disassembly of the ring in the housing is facilitated.

An object of the present invention is to provide a means for securing an outer stator ring to the housing of a turbine engine so that the ring will not rotate in the housing.

Another object is to provide a simple means for keying a stator ring to a turbine housing so that assembly and disassembly of the stator ring in the housing is facilitated.

Still another object is to provide a means for locking a stator ring which is simple to fabricate.

Still another object is to provide a means for locking a half split stator ring to a solid housing of a turbine engine, said turbine engine having a longitudinally split housing attached along a longitudinal axis to the solid housing.

Still another object is to provide a key which will prevent a stator ring from rotating within a turbine housing and which will not fall out during assembly and disassembly of the stator ring in the turbine housing.

Still another object is to provide a key which will prevent a half split stator ring from rotating in a solid housing by keying the key to the stator ring and to a longitudinally split housing said split housing being attached along a longitudinal axis of the turbine to the solid housing.

A further object of the invention is to provide a more efficient method of assembly and disassembly of a stator ring on a turbine engine housing.

Other objects and many attendant advantages of this invention will be readily appreciated as the same becomes better understood by reference to the following detailed description when considered in connection with the accompanying drawings wherein.

Figure 1:
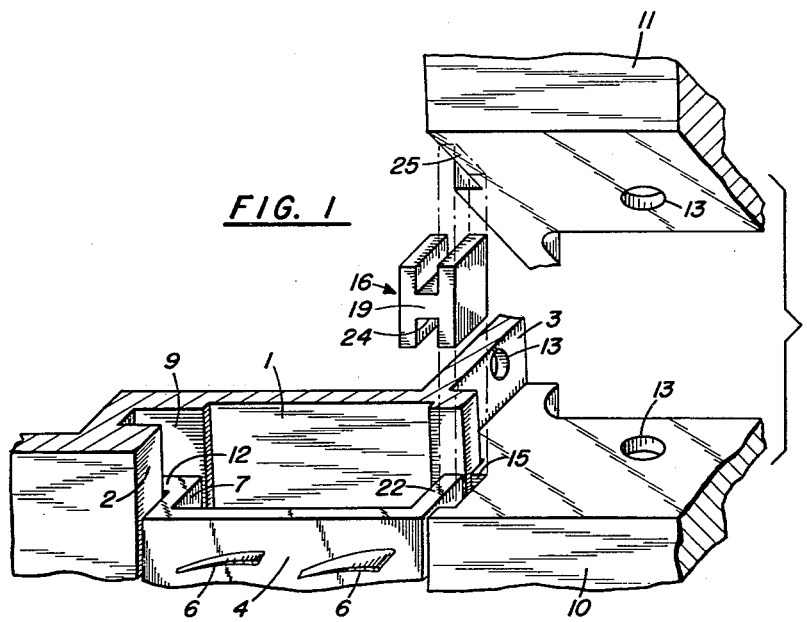
Fig. 1 shows an exploded plan view, partly in section looking at a key, the solid housing, and a portion of the split housing from one angle and looking at another portion of the split housing which mates with the first portion from another angle.
Figure 2:
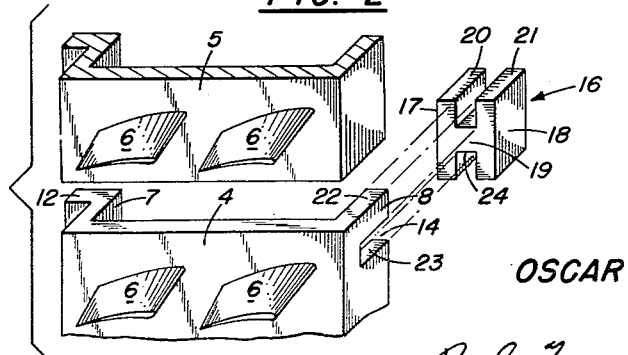
Fig. 2 is an exploded plan view, partly in section showing the manner in which the key fits into a cutout in the stator ring.

Referring now to the drawings, wherein like reference characters designate like or corresponding parts throughout the several views numeral 1 refers to a solid turbine housing which has an inwardly projecting peripheral flange 2 and an outwardly projecting peripheral flange 3. Numerals 4 and 5 refer to half segments of a stator ring upon which are mounted stator vanes 6. Both half segments 4 and 5 of the stator ring have outwardly projecting peripheral flanges 7 and 8. Flange 7 has a peripheral tongue 12 which is adapted to mate with a peripheral groove 9 in flange 2 so that the stator ring segments 4 and 5 are free to rotate within housing 1 unless prevented from doing so. Longitudinally half split housings 10 and 11 are attached to housing 1 by any suitable means preferably by bolts and nuts (not shown), through holes 13. Flange 8 on stator half ring 4 is provided with a cutout 14 and half split housing 10 is provided with a recess 15. After assembly of all the components, recess 15 will be located substantially adjacent to cutout 14 and surface 25 of half split housing 11 will lay across recess 15 to form a bearing surface. An H type key generally designated by numeral 16 is adapted to engage cutout 14 and to loosely engage recess 15. Key 16 has two parallel members generally designated by numerals 17 and 18 which are spaced by an integral cross member 19 a sufficient distance apart to engage flange 8 of half stator ring 4. Cross member 19 is adapted to engage cutout 14 so that ends 20 and 21 of key 16 will lay flush with end 22 of flange 8 on half stator ring 4. The size of key 16, cutout 14 and recess 15 will be governed by the shear and bearing area necessary to overcome the torque tending to rotate ring segments 4 and 5 in housing 1.

In assembling the apparatus key 16 is slid into position in cutout 14 of half ring segment 4 and both half ring segments 4 and 5 are positioned within housing 1. At this stage of the assembly segments 4 and 5 are free to rotate within housing 1 but key 16 is prevented from falling out radially or longitudinally to the engine by members 17 and 18 of key 16. Next half ring segments 4 and 5 are rotated within housing 1 to a predetermined position so that recess 15 of split housing 10 will engage member 18 of key 16. After this engaging action split housing 10 is secured in place to housing 1 and split housing 11 is secured in place to housing 1 and split housing 10. Disassembly of the parts would be in reverse order and it is now apparent that assembly and disassembly of the components are facilitated since key 16 is prevented from falling out after ring segment 4 is mounted in housing 1.

Upon the application of torque to ring segments 4 and 5 in an upward direction in relation to the drawings surface 23 of cutout 14 will bear against surface 24 of key 16 and the latter surface will be restrained from movement by the bearing of surface 21 of key 16 on surface 25 of split housing 11.

It should be understood that the foregoing disclosure relates to only a preferred embodiment of the invention and that without departing from the spirit and scope of the invention each stator ring segment may be keyed as set forth above, the stator ring may be split into any number of segments, the ring segments may be retained in rotating relationship with housing 1 by means other than a tongue and groove, and split housings 10 and 11 could just as well be integrated into a solid housing.

Obviously many modifications and variations of the present invention are possible in the light of the above teachings. It is therefore to be understood that within the scope of the appended claim the invention may be practiced otherwise than as specifically described.

What is claimed is:

An elastic fluid turbine engine comprising an annular solid housing, an annular half split housing being divided into a first half split housing and a second half split housing and being located to the rear of and adjacent said solid housing, a stator ring disposed in said solid housing having first and second outwardly extending peripheral flanges forming its sides, the rear face of the first flange being substantially radially aligned with the junction of the solid housing and the split housing said junction formed by the rear face of the solid housing and the front face of the split housing, said solid housing having an inwardly extending peripheral flange, the rear face of said latter flange having an arcuate groove, the second flange of said stator ring having a forward extending arcuate lip for mating relationship with said arcuate groove, said stator ring being divided into first stator half ring and second stator half ring segments the mutual abutting ends of the stator half rings being longitudinally aligned with the split in said split housing, at least one of the stator half rings having a cutout through its first peripheral flange a predetermined distance from said mutual abutting ends of the stator half rings, the front face of at least one of the half split housings having a recess extending a predetermined distance from the split in said split housing, an H-shaped key having first and second parallel flat members and having a third member integral with and perpendicular to said first and second flat members so that said first and second flat members are spaced to receive therebetween the first flange of said stator ring, the second flat member being adjacent the front face of said first flange and the first flat member being adjacent the rear face of said first flange, said third member of said key adapted to mate with the cutout in said first flange of said stator half ring and said rear second member of said key adapted to mate with the recess in said half split housing so that torque tending to rotate the stator ring within the solid housing is restrained by the bearing of one face of the cutout in said stator half ring on the third member of said key, said third member being held stationary by the bearing of the first flat member of said key on said split housing.

References Cited in the file of this patent

UNITED STATES PATENTS

| | | |
|---|---|---|
| 2,392,281 | Allen | Jan. 1, 1946 |
| 2,488,867 | Judson | Nov. 22, 1949 |
| 2,579,583 | Johnson | Dec. 25, 1951 |
| 2,606,742 | Giles | Apr. 12, 1952 |
| 2,722,373 | Ledwith et al. | Nov. 1, 1955 |
| 2,738,949 | Wilkinson | Mar. 20, 1956 |

FOREIGN PATENTS

| | | |
|---|---|---|
| 220,316 | Austria | Feb. 18, 1959 |